United States Patent
Daggubati et al.

(10) Patent No.: US 11,321,653 B2
(45) Date of Patent: May 3, 2022

(54) DATABASE SYSTEM ARCHITECTURE FOR REFUND DATA HARMONIZATION

(71) Applicant: MASTERCARD INTERNATIONAL INCORPORATED, Purchase, NY (US)

(72) Inventors: Lakshmi Sushma Daggubati, O'Fallon, MO (US); Sri Chaitanya Sanaboina, O'Fallon, MO (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 187 days.

(21) Appl. No.: 16/237,054

(22) Filed: Dec. 31, 2018

(65) Prior Publication Data

US 2020/0210913 A1    Jul. 2, 2020

(51) Int. Cl.
| | |
|---|---|
| G06Q 10/06 | (2012.01) |
| G06F 16/22 | (2019.01) |
| G06F 16/248 | (2019.01) |
| G06F 16/242 | (2019.01) |
| G06F 16/25 | (2019.01) |

(52) U.S. Cl.
CPC ..... *G06Q 10/0635* (2013.01); *G06F 16/2228* (2019.01); *G06F 16/242* (2019.01); *G06F 16/248* (2019.01); *G06F 16/258* (2019.01)

(58) Field of Classification Search
USPC .......................................................... 705/38
See application file for complete search history.

(56) References Cited

U.S. PATENT DOCUMENTS

| | | |
|---|---|---|
| 5,895,453 A | 4/1999 | Cook |
| 6,016,480 A | 1/2000 | Houvener et al. |
| 7,379,899 B1 | 5/2008 | Junger |
| 7,505,931 B2 | 3/2009 | Da Silva |
| 8,104,682 B2 | 1/2012 | Junger |
| 8,583,478 B2 | 11/2013 | Hammond et al. |
| 8,595,062 B2 | 11/2013 | Junger et al. |
| 8,635,168 B2 | 1/2014 | Junger et al. |
| 8,653,973 B2 | 2/2014 | Moradian et al. |
| 8,857,710 B1 | 10/2014 | Kowalchyk et al. |
| 8,868,454 B1 | 10/2014 | Blank et al. |

(Continued)

FOREIGN PATENT DOCUMENTS

| | | |
|---|---|---|
| WO | 2012119008 A2 | 9/2012 |
| WO | 2016058027 A1 | 4/2016 |

*Primary Examiner* — Ambreen A Alladin
(74) *Attorney, Agent, or Firm* — Armstrong Teasdale LLP

(57) ABSTRACT

A refund tracking (RT) computing device including a processor and a memory in communication with the processor is provided. The RT computing device is configured to receive historical transaction data from a payment network or a merchant data source, the historical transaction data received in different formats, parse data fields from the historical transaction data, store the parsed data fields for each of the transactions in a respective harmonized refund data structure in a database, receive current transaction data for a current transaction from a merchant computing device, retrieve at least one harmonized refund data structure from the database, determine a refund risk score based on comparing the current transaction data to the at least one harmonized refund data structure, and transmit the refund risk score to the merchant terminal.

22 Claims, 9 Drawing Sheets

(56) References Cited

U.S. PATENT DOCUMENTS

| | | |
|---|---|---|
| 8,942,990 B2 | 1/2015 | Jankowski et al. |
| 9,214,075 B2 | 12/2015 | Moradian et al. |
| 9,652,732 B1* | 5/2017 | Barstad .................. G06Q 30/06 |
| 9,996,838 B2 | 6/2018 | Harris et al. |
| 2001/0032141 A1 | 10/2001 | Drattell |
| 2002/0065727 A1 | 5/2002 | Enoki et al. |
| 2006/0237534 A1 | 10/2006 | Junger et al. |
| 2008/0048030 A1 | 2/2008 | Garner |
| 2010/0235290 A1 | 9/2010 | Junger et al. |
| 2011/0087537 A1 | 4/2011 | Hanafi et al. |
| 2011/0087606 A1 | 4/2011 | Hammond et al. |
| 2012/0271660 A1* | 10/2012 | Harris .................... G06Q 20/12 705/4 |
| 2012/0310657 A1 | 12/2012 | Jankowski et al. |
| 2014/0172697 A1 | 6/2014 | Ward et al. |
| 2014/0250011 A1* | 9/2014 | Weber ................ G06Q 20/4016 705/44 |
| 2014/0278883 A1 | 9/2014 | Wang et al. |
| 2015/0052069 A1 | 2/2015 | Hilo |
| 2016/0148209 A1 | 5/2016 | Hammond et al. |
| 2017/0249637 A1 | 8/2017 | Tribak Lyedri et al. |
| 2018/0005234 A1 | 1/2018 | Van Leuven et al. |
| 2018/0165908 A1 | 6/2018 | Patel et al. |
| 2019/0087805 A1* | 3/2019 | Hayes ................. G06Q 20/401 |

\* cited by examiner

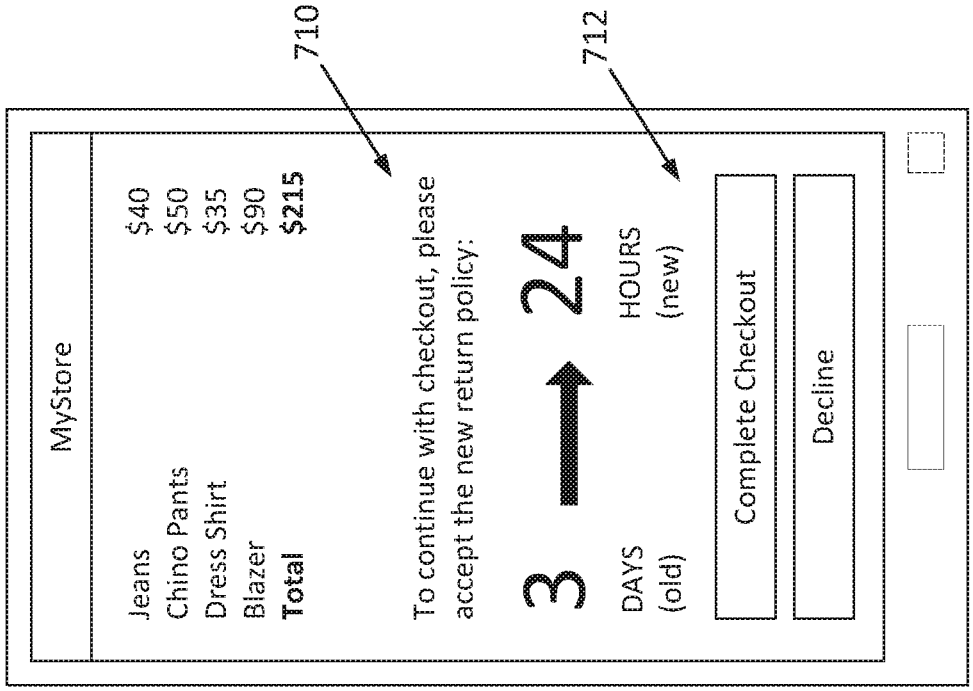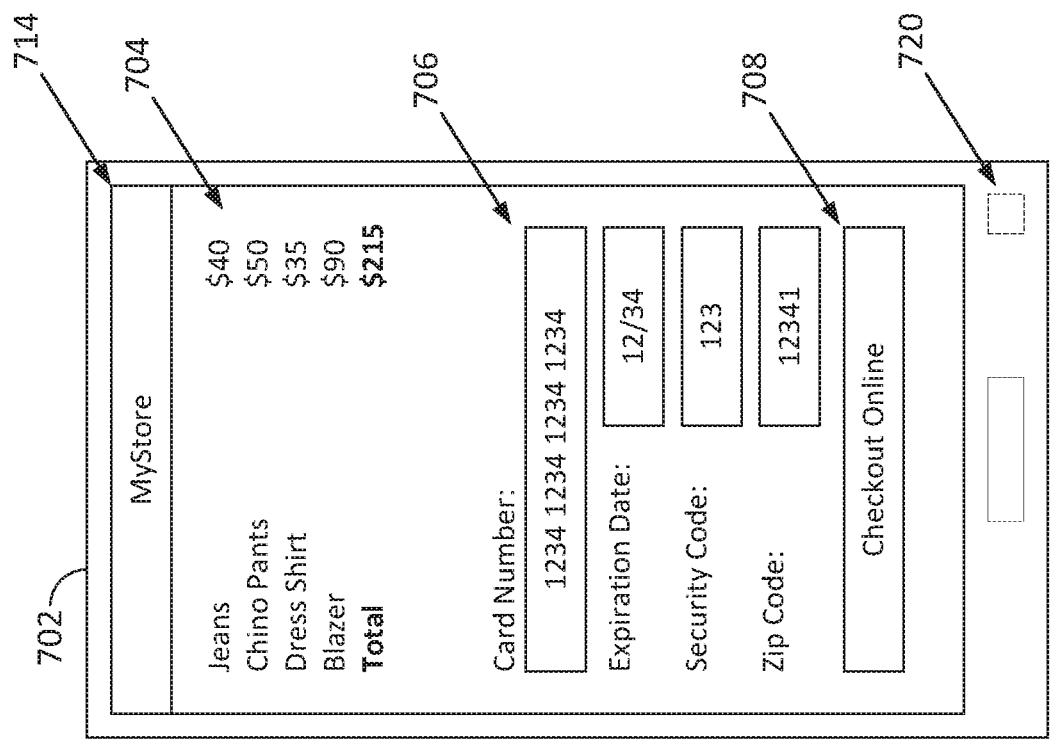
FIG. 7

DATABASE SYSTEM ARCHITECTURE FOR REFUND DATA HARMONIZATION

BACKGROUND

This disclosure relates generally to data harmonization for detecting fraudulent activities and, more specifically, to a database architecture for refund data aggregation and analysis, and predicting refund fraud.

Consumers expect purchases to be covered by return and/or refund policies. For example, unsatisfactory pet food is refunded, or clothing is returned for a full refund within, for example, 14 days. Merchants generally offer some level of return/refund availability for purchases, making return/refund opportunities prevalent.

At least some merchants may flag customers based on previous abuses of return/refund policies. For example, a customer may be banned after multiple fraudulent return attempts, such as returning counterfeit goods. As another example, consumers may purchase, use, and return products to avoid paying for their use. Certain merchants may track returns and refunds based on driver's license information captured at the time of return/refund. These systems are effective in view of repeated instances of return/refund fraud against a particular merchant.

However, given the availability of return/refund policies across merchants, some consumers may avoid detection by distributing fraudulent activity over a number of merchants. For example, a consumer may repeatedly purchase and return laptops from different merchants, without using the same merchant within a one-year period. Existing systems may not be able to detect fraudulent return/refund patterns distributed between multiple merchants. Further, refund data is generally stored in merchant-specific data structures, making it difficult or impossible to coordinate refund data between merchants.

Additionally, at least some known systems are only able to intervene at the point of return/refund (i.e., after a return/refund policy was offered to a consumer during a purchase). Thus, limiting the usefulness of these known systems.

Accordingly, a system is needed to predict return/refund risk at the time of purchase, such that merchants may intervene before product return/refund fraud happens.

BRIEF DESCRIPTION

In one aspect, a refund tracking (RT) computing device including a processor and a memory in communication with the processor is provided. The RT computing device is configured to receive historical transaction data representing transactions from a payment network or a merchant data source, wherein the historical transaction data is received in different formats, and parse data fields that include a cardholder identifier, a transaction date, a transaction amount, and a merchant identifier from the historical transaction data. The RT computing device is further configured to store the parsed data fields for each of the transactions in a harmonized refund data structure in a database, receive current transaction data for a current transaction from a merchant computing device, retrieve at least one harmonized refund data structure from the database by matching the current primary account number to the primary account numbers of the at least one harmonized refund data structure, determine a refund risk score based on comparing the current transaction data to the at least one harmonized refund data structure, and transmit the refund risk score to the merchant terminal.

In another aspect, a computer-implemented method for identifying fraud in refund transactions is provided. The method is using a refund tracking (RT) including a processor and a memory in communication with the processor, and the method comprises: receiving historical transaction data representing transactions from a payment network or a merchant data source, wherein the historical transaction data is received in different formats, and parsing data fields that include a cardholder identifier, a transaction date, a transaction amount, and a merchant identifier from the historical transaction data. The method further comprising storing the parsed data fields for each of the transactions in a respective harmonized refund data structure in a database, receiving current transaction data for a current transaction from a merchant computing device, retrieving at least one harmonized refund data structure from the database by matching the current primary account number to the primary account numbers of the at least one harmonized refund data structure, determining a refund risk score based on comparing the current transaction data to the at least one harmonized refund data structure, and transmitting the refund risk score to the merchant terminal.

In another aspect, a non-transitory computer-readable storage media having computer-executable instructions is provided. When executed by a refund tracking (RT) computing device, the computer-executable instructions cause the processor to receive historical transaction data representing transactions from a payment network or a merchant data source, wherein the historical transaction data is received in different formats, and parse data fields that include a cardholder identifier, a transaction date, a transaction amount, and a merchant identifier from the historical transaction data, store the parsed data fields for each of the transactions in a respective harmonized refund data structure in a database. The computer-executable instructions further cause the processor to receive current transaction data for a current transaction from a merchant computing device, retrieve at least one harmonized refund data structure from the database by matching the current primary account number to the primary account numbers of the at least one harmonized refund data structure, determine a refund risk score based on comparing the current transaction data to the at least one harmonized refund data structure, and transmit the refund risk score to the merchant terminal.

BRIEF DESCRIPTION OF THE DRAWINGS

FIG. 7 is a schematic diagram illustrating an exemplary user device for the system shown in FIGS. 1-3.

DETAILED DESCRIPTION

Figure 1:
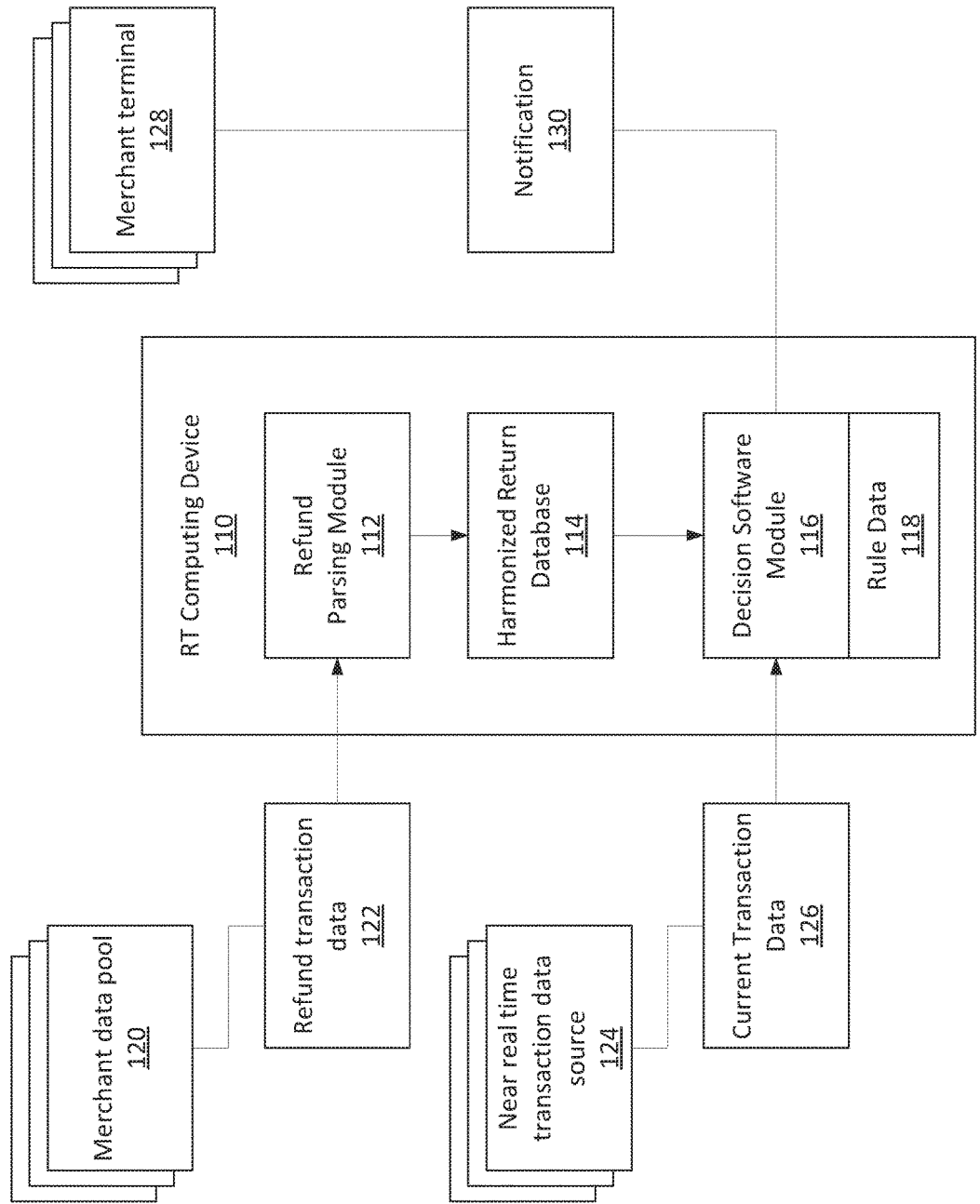
FIG. 1 is a schematic diagram illustrating an exemplary RT computing device for tracking refund transactions.

The following detailed description illustrates embodiments of the disclosure by way of example and not by way of limitation. The description enables one skilled in the art to make and use the disclosure. It also describes several embodiments, adaptations, variations, alternatives, and uses of the disclosure, including what is presently believed to be the best mode of carrying out the disclosure.

The systems and methods of the disclosure facilitate notifying or alerting merchants in response to predicted refund fraud. A refund tracking ("RT") computing device is provided. In the example embodiment, the RT computing device may harmonize (e.g., aggregate, standardize) return and/or refund transaction data received from data sources including merchant computing systems and payment networks. The RT computing device may aggregate refund data based on an identifier associated with the consumer (e.g., payment card number, primary account number) and/or product identifiers, such as product category identifiers and stock keeping unit ("SKU") codes.

In an example embodiment, the RT computing device receives payment card transaction data from a payment card processing network. The RT computing device is configured to filter the transaction data to identify refund transactions. Additionally or alternatively, the RT computing device receives transaction data directly from a merchant computing system, where the transaction data includes product data, such as product identifiers, SKUs, and product category identifiers.

In certain embodiments, the RT computing device generates refund risk notifications at a time of a purchase of a product. For example, refund risk notifications may include a refund risk score, indicating a likelihood of a consumer returning/refunding the purchase based on previous transaction data aggregated by the RT computing device. Alternatively, risk notifications may include a risk flag, such that a merchant is prompted to obtain additional confirmation before the associated payment transaction is completed and/or authorized.

In an example embodiment, the RT computing device generates refund risk notifications in response to a payment card purchase transaction. A request for authorization of a payment card transaction is received by a payment network from a merchant. The RT computing device is in communication with the payment card processing network. The RT computing device determines a refund risk score and transmits a refund risk notification based on the refund score to the merchant. In certain embodiments, the merchant decides to accept or cancel the payment card transaction based on the refund risk notification.

In some embodiments, the RT computing device is configured to respond in near-real-time to the initiation of payment card transactions with an elevated refund risk. In other words, the RT computing device may interrupt transaction processing on payment network computing systems and/or merchant computing systems using a refund risk notification, to prevent the transaction from being completed.

For example, the RT computing device is configured to notify a merchant at the time a payment transaction is initiated, rather than at the time return/refund is attempted by the customer. Intervening at the time of the initial purchase transaction allows a merchant to extend a modified and/or limited return/refund policy to a customer, rather than forcing the merchant to reject a later attempted return/refund. This may reduce fraudulent return/refunds, which are costly and time-consuming to process. For example, where a consumer is associated with repeatedly returning clothing, a modified refund policy imposed at the time of purchase may limit clothing returns to 24 hours after purchase, in lieu of a more lenient time window.

Return/refund data maintained by various merchants may be difficult to aggregate across merchants due to the varying types of database and/or data structures employed by individual merchants. Accordingly, the RT computing device is configured not only to retrieve return/refund data from multiple merchants, but also to harmonize the retrieved return/refund data such that it is aggregated and stored in a unified architecture in a central database. For example, the RT computing device is configured to parse refund transaction data out of unstructured data maintained by a merchant. Additionally or alternatively, the RT computing device is configured to retrieve and/or receive transaction data from multiple data sources (e.g., relational databases, document databases, unstructured data). Coordinating data from multiple data sources allows the RT computing device to detect refund fraud performed by a particular consumer across multiple merchants.

The RT computing device is configured to harmonize refund transaction data from any number of sources, including retail merchants and online ecommerce platforms. For example, at least some merchants maintain separate return processing systems for online and in-store transactions.

In some embodiments, the RT computing device is configured to retrieve refund transaction data from a merchant data pool using a direct connection, such as an HTTP API or OBDC (Open Database Connectivity) connection. For example, the RT computing device may periodically (e.g., daily, weekly, hourly) retrieve refund transaction data from a merchant data pool by submitting an HTTP API request or directly querying a merchant database.

In other embodiments, the RT computing device is configured to receive refund transaction data from merchants. In other words, merchants may periodically submit refund transaction data to the RT computing device. For example, merchants may use a HTTP API provided by the RT computing device to periodically submit refund transaction data. A merchant may use a return reporting HTTP API to programmatically submit refund transactions to the RT computing device as they are processed by the merchant. Alternatively, a tabular and/or serialized data structure is transmitted to the RT computing device by a merchant. For example, a spreadsheet document listing refund/return transactions at a merchant for a given time period may be emailed to an address associated with the RT computing device for automated processing.

In certain embodiments, the RT computing device receives payment card transactions from a payment card network, and identifies any number of the payment card transactions as being a return and/or refund transaction. In other words, the RT computing device is configured to filter return and/or refund transactions from a payment card transaction data source. The RT computing device filters return and/or refund transactions based on at least one of transaction amount (i.e., indicating funds returned to the cardholder), transaction addendum data, merchant identifier, merchant category identifier, and the like.

The RT computing device is further configured to parse refund transaction data after it is received and/or retrieved from a merchant data source. The refund transaction data is typically in a format native to the merchant, and requires further processing before it can be stored in a refund database architecture unified across multiple merchants. Merchants may store refund transaction data in a variety of formats, including tabular databases and unstructured documents. Additionally, merchants may use different value and/or field identifiers for like data. The RT computing device is configured to parse refund transaction data such that it is stored in a harmonized refund database architecture.

In addition to parsing and storing refund transaction data, the RT computing device is configured to respond to payment card transaction authorization requests from merchants. Merchants may generate an authorization request when customers present a payment card for payment. The authorization request includes an account number, merchant identifier, and a transaction amount. In some embodiments, the authorization request further includes addendum data, such as identifiers of products and/or categories of products being purchased. Additionally or alternatively, the authorization request may include a merchant category identifier identifying the goods being purchased, such as clothing, furniture, or electronics.

The RT computing device includes a decision software module configured to generate responses (e.g., notifications regarding potential return/refund fraud) to received authorization requests. The decision software module uses rule data and/or the harmonized refund database to generate responses. In one embodiment, the RT computing device queries the harmonized refund database using an account and/or cardholder identifier included in the authorization request, to retrieve relevant refund data from the harmonized database. The decision software module applies any number of rules to the selected refund data. For example, the rules may specify aggregating the number of refund transactions for the account and/or cardholder within a recent time period (e.g., the previous 3 days) to generate a refund risk score. The rules may also generate an elevated refund risk score, in response to a relatively large number of refund transactions being associated with the account number in the recent time period.

In some embodiments, the RT computing device transmits the refund risk score generated by the decision software module to a merchant terminal as a notification. Additionally or alternatively, the RT computing device may transmit a modified refund policy to the merchant terminal. The modified refund policy typically includes a limited return timeframe and/or return waiver requirement. For example, the notification to the merchant may include a refund risk score, along with a maximum return window of 3 days. As another example, the notification may include an indicator that the refund policy excludes refunds on purchases of a specific category of product, such as blue jeans.

The technical problems addressed by the disclosure include at least one of: (i) collecting data stored in different merchant specific data structures from multiple merchant data sources, (ii) harmonizing and/or aggregating return/refund transaction data in a unified database architecture, and (iii) detecting return/refund fraud operating across multiple merchants from incompatible source data.

The systems and methods of the disclosure are implemented using computer programming or engineering techniques including computer software, firmware, hardware, or any combination or subset thereof, wherein the technical effects are achieved by: (i) receiving historical transaction data representing transactions from a payment network or a merchant data source, the historical transaction data received in different formats; (ii) parsing data fields including a cardholder identifier, a transaction date, a transaction amount, and a merchant identifier from the historical transaction data; (iii) storing the parsed data fields for each of the transactions in a harmonized refund data structure in a database indexed using a primary account number associated with the cardholder identifier; (iv) receiving current transaction data for a current transaction from a merchant; (v) retrieving at least one refund data structure from the database by matching the current primary account number to the primary account numbers of the at least one refund data structure; (vi) determining a refund risk score based on comparing the current transaction data to the at least one refund data structure; and (vii) transmitting the refund risk score to the merchant terminal.

The resulting technical benefits achieved by the systems and method of the disclosure include at least one of: (i) detecting return/refund transactions being processed over a payment network, (ii) intervening in near-real-time after the initiation of payment card transactions associated with return/refund fraud, e.g., before an authorization response is returned by a payment card processing network, (iii) automated prediction of return/refund fraud across multiple merchants, (iv) harmonization of return/refund transaction data previously stored in merchant-specific data structures, (v) centralization of return/refund transaction data previously stored in individual merchant data sources, (vi) reduced messaging across the network by detecting fraudulent messages before the actual networks are used, thus improving overall bandwidth and processing capability of the network, and (vii) improved data storage for real-time retrieval of harmonized refund data to allow for improved retrieval of said harmonized data.

In one embodiment, a computer program is provided, and the program is embodied on a computer-readable medium. In an example embodiment, the system is executed on a single computer system, without requiring a connection to a server computer. In a further example embodiment, the system is run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Apple Inc. located in Cupertino, Calif.). In yet a further embodiment, the system is run on a Mac OS® environment (Mac OS is a registered trademark of Apple Inc. located in Cupertino, Calif.). The application is flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

In one embodiment, a computer program is provided, and the program is embodied on a computer-readable medium and utilizes a Structured Query Language (SQL) with a client user interface front-end for administration and a web interface for standard user input and reports. In another embodiment, the system is web enabled and is run on a business entity intranet. In yet another embodiment, the system is fully accessed by individuals having an authorized access outside the firewall of the business-entity through the Internet. In a further embodiment, the system is being run in a Windows® environment (Windows is a registered trademark of Microsoft Corporation, Redmond, Wash.). The application is flexible and designed to run in various different environments without compromising any major functionality.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus, are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database implementation (e.g., relational, document-based) may be used that enables the system and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The term processor, as used herein, may refer to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are for example only, and are thus not limiting as to the types of memory usable for storage of a computer program.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, any type of virtual card (e.g. virtual cards generated by issuers and/or third party processors via mobile bank or desktop apps) and/or any other device that may hold payment account information, such as mobile phones, Smartphones, personal digital assistants (PDAs), key fobs, digital wallets, and/or computers. Each type of transactions card can be used as a method of payment for performing a transaction. As used herein, the term "payment account" is used generally to refer to the underlying account with the transaction card. In addition, cardholder card account behavior can include but is not limited to purchases, management activities (e.g., balance checking), bill payments, achievement of targets (meeting account balance goals, paying bills on time), and/or product registrations (e.g., mobile application downloads).

As used herein, the term "transaction data" refers to data that includes at least a portion of a cardholder's account information (e.g., cardholder name, account identifier, credit line, security code, and/or expiration data) and at least a portion of purchase information (e.g., price, a type of item and/or service, SKU number, item/service description, purchase date, and/or confirmation number) supplied by a merchant from which the cardholder is making a purchase.

FIG. 1 is a schematic diagram illustrating an exemplary refund tracking ("RT") computing device 110 for tracking refund transactions. RT computing device 110 is connected to a merchant data pool 120. As used herein, a merchant data pool refers to any combination of data sources (e.g., structured databases, unstructured text files, etc.) associated with any number of merchants. For example, merchant data pool 120 may include refund transaction database associated with multiple merchants, where each refund transaction database may have a different data structure (e.g., table structure, key values, etc.).

In some embodiments, RT computing device 110 is configured to retrieve refund transaction data 122 from merchant data pool 120 using an active request (e.g., database query). For example, RT computing device 110 may transmit a HTTP API request to merchant data pool 120 to retrieve recent refund transactions. In other embodiments, RT computing device 110 is configured to receive refund transaction data 122 periodically and/or in response to refund transaction data 122 being generated. For example, merchant data pool 120 may transmit refund transaction data 122 on a preset schedule. As another example, merchant data pool 120 may transmit refund transaction data 122 to RT computing device 110 after each refund transaction has been processed.

Refund transaction data 122 is associated with return and/or refund transactions processed by a merchant. For example, a merchant may refund a customer for a defective product, or refund a customer after a product is returned. Refund transaction data 122 is received from any number of merchants, and may not have a consistent data structure. Refund transaction data 122 includes, for example a cardholder identifier, a primary account number ("PAN"), a customer number, a transaction identifier, and the like. In other words, refund transaction data 122 generally includes a refund and/or customer identifier for each processed refund transaction included. Refund transaction data 122 further includes a merchant identifier and/or merchant category identifier. Additionally or alternatively, refund transaction data 122 may include product identifiers and/or product category identifiers. In one embodiment, refund transaction data 122 includes category identifiers based on products returned. For example, where a customer returns a pair of jeans, refund transaction data may include a product identifier for the jeans purchased, and/or a category identifier associated with clothing. Refund transaction data 122 may include transaction amounts and/or transaction timestamps.

Due to the varying data structures of refund transaction data 122, RT computing device 110 includes refund parsing module 112, configured to harmonize the data structures included in refund transaction data. In one embodiment, refund parsing module 112 is configured to determine a PAN for each refund transaction based on identifiers included in refund transaction data 122, such as transaction identifiers, customer identifiers, and cardholder identifiers. For example, refund parsing module 112 may use a transaction identifier included in refund transaction data 122 to retrieve a PAN. In other words, refund parsing module 112 may lookup PANs for each refund transaction, to ensure a harmonized refund transaction data structure for each transaction includes a PAN. The lookup may be performed using a database associated with a payment card network, such as interchange network 928 (shown in FIG. 9), and/or a database associated with RT computing device 110, such as database 525 (shown in FIG. 5).

In certain embodiments, RT computing device 110 is configured to query any number of additional databases to harmonize refund transaction data 122. In one embodiment, refund transaction data 122 includes a tokenized primary account number, and RT computing device 110 queries the payment network database to retrieve the PAN using the token.

In certain embodiments, refund transaction data 122 matches data fields between the received transaction data 122 and a schema of a harmonized refund database 114. For example, refund transaction data 122 may include multiple dates associated with processing the return, and refund parsing module 112 may select the date the return/refund was initiated. Additionally or alternatively, refund parsing module 112 may transform data to a standard format. Merchants may store data such as dates, times, category identifiers, and the like, in differing formats. Refund parsing module 112 converts the data to a standard/uniform format to facilitate comparisons and/or efficient storage in harmonized refund database 114. In other words, refund parsing module 112 harmonizes refund transaction data 122 to conform to the schema (e.g., internal data structure specification) of harmonized refund database 114. As used herein, harmonized refund database refers to previously unstructured data (e.g., data retrieved from the merchant data pool) that has been given a consistent format and/or data structure (e.g., table structure, key values, data unit/format). For example, dates may be stored in varying formats by different vendors, but RT computing device 110 is configured to convert the date values to a consistent format before storage in the harmonized database (e.g., harmonized refund database 114).

Harmonized refund database 114 stores refund transaction data 122 after it has been processed by refund parsing module 112. Harmonized refund database 114 is configured such that refund transactions are aggregated and/or retrieved efficiently. For example, harmonized refund database 114 may include any number of refund transactions indexed by PAN values, where each refund transaction has a consistent data structure (e.g., comparable data fields and formats of stored data), such that refund transactions with the same PAN are efficiently retrieved and compared by a decision software module 116.

RT computing device 110 is further configured to receive authorization requests from a near real time data source 124, which is associated with a payment card network processing payment card transactions. In one embodiment, RT computing device 110 receives current transaction data 126 in response to a merchant initiating a payment card transaction for a customer. Current transaction data 126 may include any combination of a PAN, transaction amount, merchant identifier, merchant category identifier, product identifiers, and product category identifiers. For example, current transaction data 126 may include an authorization request.

The payment network is configured to process authorization messages, such as ISO 8583 compliant messages and ISO 20022 compliant messages. As used herein, "ISO" refers to a series of standards approved by the International Organization for Standardization (ISO is a registered trademark of the International Organization for Standardization of Geneva, Switzerland). ISO 8583 compliant messages are defined by the ISO 8583 standard which governs financial transaction card originated messages and further defines acceptable message types, data elements, and code values associated with such financial transaction card originated messages. ISO 8583 compliant messages include a plurality of specified locations for data elements. ISO 20022 compliant messages are defined by the ISO 20022 standard. For example, ISO 20022 compliant messages may include acceptor to issuer card messages (ATICA).

Decision software module 116 generates a notification 130 in response to current transaction data 126 based on applying rule data 118 to harmonized refund database 114. Specifically, decision software module 116 compares current transaction data 126 to refund transaction data in database 114 to determine a refund risk score. In one embodiment, where current transaction data 126 includes a PAN, decision software module 116 is configured to retrieve refund transactions from harmonized refund database including the same PAN. Decision software module 116 is further configured to compare merchant identifiers, merchant categories, product identifiers, and product categories from the retrieved refund transaction data to the authorization request. In one embodiment, decision software module 116 determines the authorization request includes a merchant identifier and/or category prevalent in the retrieved refund transaction data. In other words, after retrieving the refund history associated with the PAN, decision software module 116 may use merchant category identifiers to determine there have been multiple previous refunds to the same cardholder at similarly classified merchants as the present current transaction data 126.

In certain embodiments, RT computing device 110 stores rule data 118 in a database. In the example embodiment, rule data 118 includes rules for generating notification 130 based on specific ranges of primary account numbers and/or specific merchant identifiers. Decision software module 116 retrieves rules based on a merchant identifier and/or a primary account number. In other words, different merchants and/or payment card issuers may result in application of different rules. Rule data 118 includes a score threshold for generating notification 130 associated with a merchant and/or payment card issuer. For example, a merchant may request notifications only when the refund risk score is above a certain threshold, as defined in rule data 118.

RT computing device 110 is configured to transmit notification 130, generated by decision software module 116, to a merchant terminal 128. In one embodiment, merchant terminal 128 is a web server initiating online payment card transactions. In another embodiment, merchant terminal 128 is a retail point-of-sale system configured to capture payment card data. In the example embodiment, merchant terminal 128 previously generated current transaction data 126. Alternatively, merchant terminal 128 is a centralized system for processing notifications associated with refund risk. In other words, notification 130 is transmitted to a predefined merchant terminal and/or a merchant terminal associated with current transaction data 126.

In one embodiment, notification 130 includes a refund risk score and/or risk flag. For example, a refund risk score is transmitted to merchant terminal 128, such that the merchant may decide how to proceed with the transaction. Additionally or alternatively, notification 130 includes an authorization response, such that the underlying purchase transaction is approved or declined by an issuer bank, such as issuer bank 930 (shown in FIG. 9) applying standard credit authorization rules as described below. For example, network 928 and/or issuer bank 930 (shown in FIG. 9) may generate the authorization response, which may be retransmitted within notification 130 by RT computing device 110.

Merchant terminal 128 displays the risk score and/or risk flag to an operator, and prompts the operator for confirmation before further processing. Additionally or alternatively, merchant terminal 128 decides to reject an otherwise authorized transaction based on the refund risk score/flag. In yet another embodiment, a merchant provides a limited refund policy based on the refund risk score/flag. For example, for transactions having an elevated refund risk score, a merchant return/refund window may be limited to 24 hours. As another example, a customer may be required to waive a return/refund for the entire transaction or for specific items.

Figure 2:
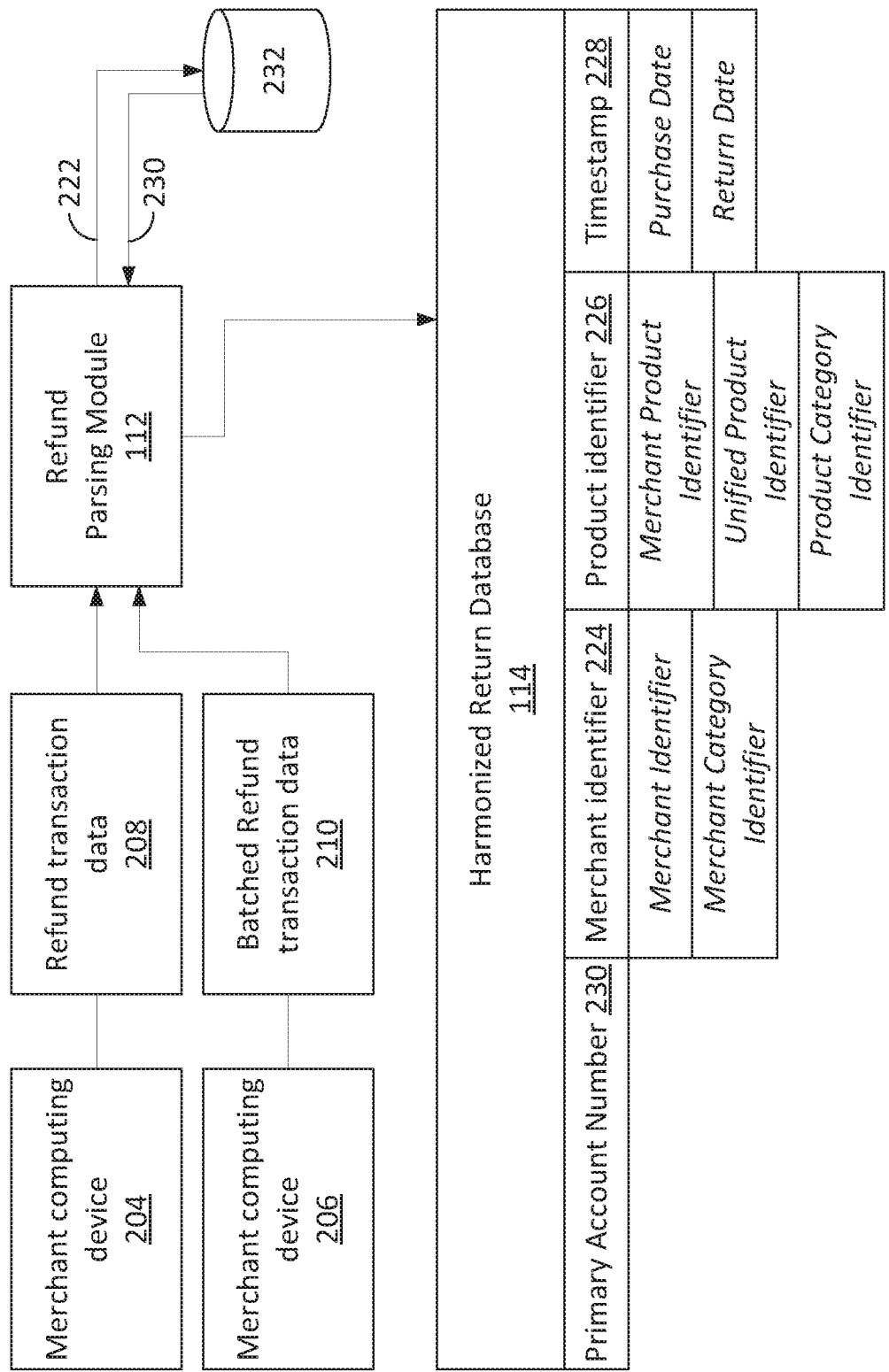
FIG. 2 is a data flow diagram of the system shown in FIG. 1 illustrating harmonization of refund data.

FIG. 2 is an exemplary data flow diagram illustrating transaction data being received/retrieved by the RT computing device of FIG. 1 from merchant data sources. Refund parsing module 112 is configured to receive refund transaction data from any number of sources, including merchant computing devices 204 and 206. In the example embodiment, merchant computing device 204 transmits refund transaction data 208 on a per-transaction basis shortly after processing a refund transaction, and merchant computing device 206 transmits batched refund transaction data 210 on a predefined schedule (e.g., daily, weekly). Refund parsing module 112 is configured to store refund transaction data in harmonized refund database 114. More specifically, refund parsing module 112 processes refund transaction data 208 and batched refund transaction data 210 before storage in harmonized refund database 114. In the example embodiment, refund parsing module 112 uses the schema (e.g., data structure and data formats) of harmonized refund database 114 to standardize the format of refund received transaction data (e.g., 28, 21).

Refund parsing module 112 identifies any number of refund transactions included in transaction data 208 or 210, and matches data fields from transaction data 208 and 210 to database fields. Refund parsing module 112 is configured to convert data for storage in database 114. For example, data such as dates, times, locations, and cardholder identifiers are converted to a standardized data format based on the configuration of database 114. Refund parsing module 112 is further configured to store the parsed data in harmonized refund database 114. For example, refund parsing module 112 may generate an insert SQL instruction based on refund transaction data 208 and 210.

Refund transaction data 208 may include various cardholder identifiers, such as account identifiers, usernames, driver's license numbers, and the like. Refund parsing module 112 is configured to retrieve primary account numbers based on cardholder identifiers, such that return data may be indexed using primary account numbers. In the example embodiment, refund transaction data 208 includes a cardholder identifier 222.

Refund parsing module 112 is configured to retrieve a primary account number 230 from an external data source 232 using cardholder identifier 222. For example, primary account number 230 may be retrieved based on a driver's license number. In the example embodiment, external data source 232 is network 928 (shown in FIG. 9). For example, a primary account number may be retrieved based on a driver's license number or account identifier. More specifically, refund parsing module 112 may query external data source 232 with cardholder identifier 222 to retrieve primary account number 230.

Harmonized refund database 114 includes any number of database fields. In the example embodiment, harmonized refund database 114 includes a primary account number 230, a merchant identifier 224, a product identifier 226, and a timestamp 228. Primary account number ("PAN") 230 derived is from cardholder identifier 222 included in refund transaction data 208 and 210, such as by datastore lookup as described above (e.g., payment card identifiers, payment card numbers, account identifiers, accountholder identifiers, cardholder identifiers, driver's license numbers, and the like). Merchant identifier 224 includes merchant identifiers and/or merchant category identifiers. Product identifier 226 includes merchant product identifiers, unified product identifiers ("UPC"), and/or product category identifiers. Timestamp 228 includes a purchase date and/or refund date.

Figure 3:
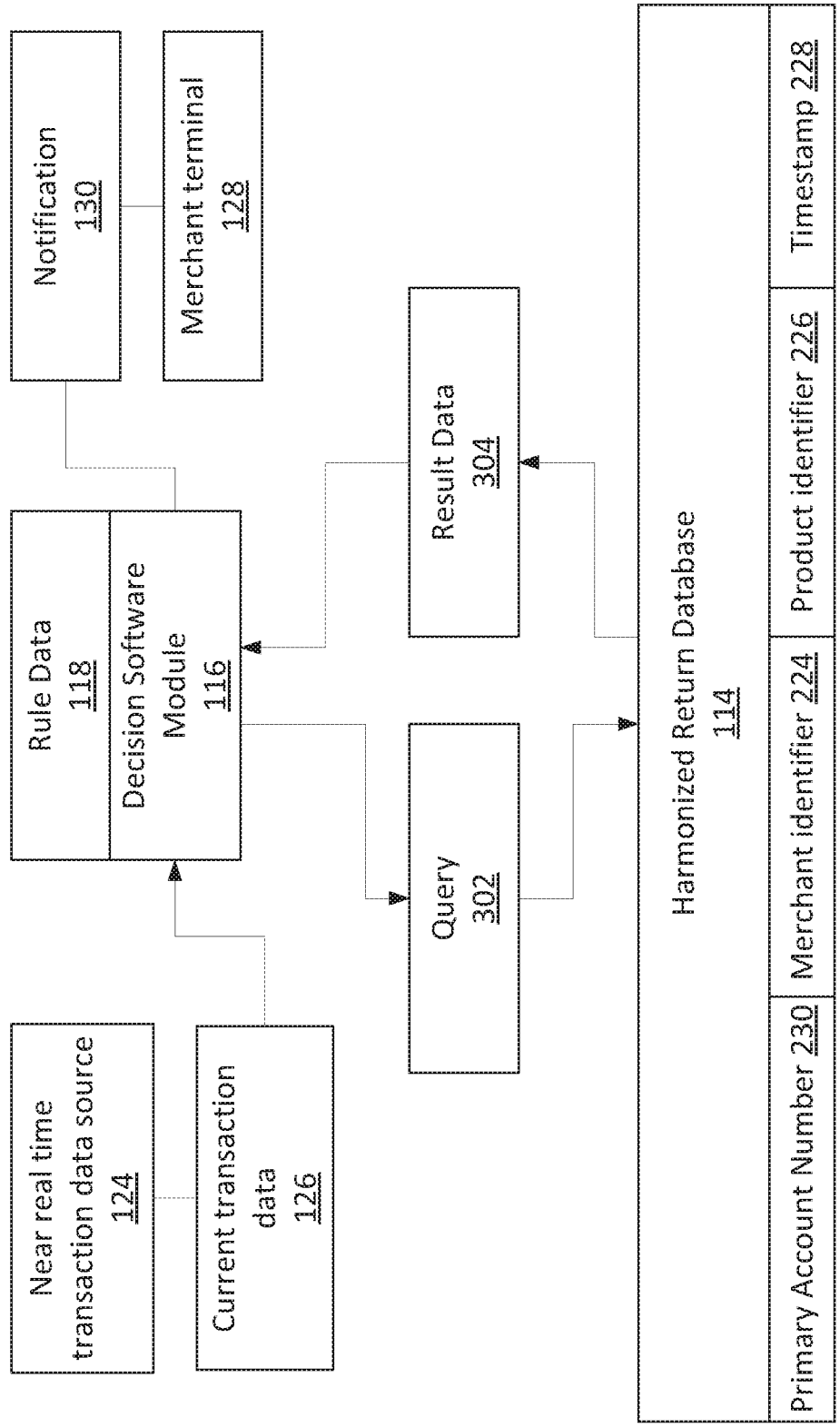
FIG. 3 is a data flow diagram of the system shown in FIG. 1 illustrating generation of notifications and risk scores.

FIG. 3 is an exemplary data flow diagram illustrating the RT computing device of FIG. 1 generating a notification in response to an authorization request.

In the example embodiment, decision software module 116 is configured to generate and transmit notification 130 to merchant terminal 128, in response to receiving current transaction data 126 from near real time data source 124. Current transaction data 126 includes a current transaction identifier, such as a PAN, cardholder identifier, or customer identifier. In certain embodiments, current transaction data 126 further includes any combination of product identifiers, product category identifiers, merchant identifiers, and merchant category identifiers.

In one embodiment, current transaction data 126 is received from a payment card network that processes payment card transactions. In other words, current transaction data 126 is received in response to a payment transaction initiated at a merchant point-of-sale device. Additionally or alternatively, current transaction data 126 is retrieved from a merchant computer system before a payment transaction is initiated. In other words, a merchant may transmit a request to preauthorize a transaction, or to estimate the refund fraud risk of a transaction. For example, a merchant web server (e.g., near real time transaction data source 124) may transmit a HTTP API request (e.g., current transaction data 126) to RT computing device 110, including a PAN and a product category identifier, to determine the refund fraud risk of a customer for a specific type of item.

Decision software module 116 is configured to generate a query 302 to harmonized refund database 114 to retrieve result data 304. In one embodiment, query 302 includes the card identifier from current transaction data 126 (e.g., a PAN, or alternatively, a current PAN associated with the current cardholder identifier obtained via lookup as described above), and is configured to retrieve database records including the PAN. In other words, query 302 retrieves records of previous returns and/or refunds using a PAN value. In certain embodiments, query 302 specifies any combination of merchant categories, product categories, product identifiers, and merchant identifiers, such that records associated with the specified categories/identifiers is selected as result data 304. For example, query 302 may select only database records including a customer PAN value and a specific merchant category, to determine the customer's history of returns/refunds at, for example, clothing merchants. Additionally or alternatively, query 302 may include a timeframe to filter based on timestamps, such as to retrieve only records of refunds/returns processed within the last 9 days.

Decision software module 116 is configured to compare result data 304 to rule data 118. Rule data 118 is specified by merchants, banks issuing payment cards, payment networks, and the like. In one embodiment, rule data 118 includes conditions for approving current transaction data 126. Additionally or alternatively, rule data 118 defines any number of conditional return/refund policies. In certain embodiments, where decision software module 116 generates a refund risk score, rule data 118 includes approving only transactions with a score below a defined threshold.

Figure 4:
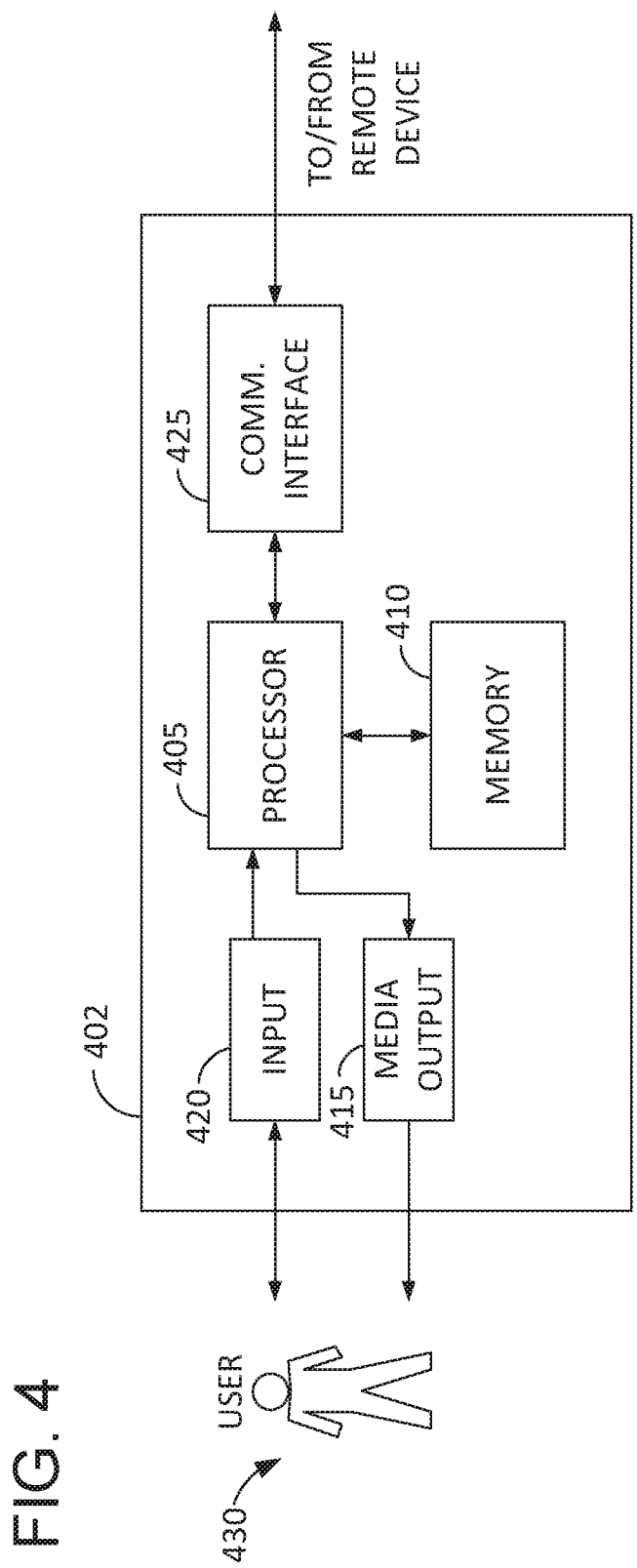
FIG. 4 illustrates an example configuration of a user device for the system shown in FIGS. 1-3.

FIG. 4 depicts an exemplary configuration of a remote or user computing device 402, such as merchant terminal 128 (shown in FIG. 1). Computing device 402 includes a processor 405 for executing instructions. In some embodiments, executable instructions is stored in a memory area 410. Processor 405 includes one or more processing units (e.g., in a multi-core configuration). Memory area 410 is any device allowing information such as executable instructions and/or other data to be stored and retrieved. Memory area 410 includes one or more computer-readable media.

Computing device 402 also includes at least one media output component 415 for presenting information to a user 430. Media output component 415 is any component capable of conveying information to user 430. In some embodiments, media output component 415 includes an output adapter, such as a video adapter and/or an audio adapter. An output adapter is operatively coupled to processor 405 and operatively coupleable to an output device such as a display device (e.g., a liquid crystal display (LCD), organic light emitting diode (OLED) display, cathode ray tube (CRT), or "electronic ink" display) or an audio output device (e.g., a speaker or headphones). In some embodiments, media output component 415 is configured to present an interactive user interface (e.g., a web browser or client application) to user 430.

In some embodiments, computing device 402 include an input device 420 for receiving input from user 430. Input device 420 includes, for example, a keyboard, a pointing device, a mouse, a stylus, a touch sensitive panel (e.g., a touch pad or a touch screen), a camera, a gyroscope, an accelerometer, a position detector, and/or an audio input device. A single component such as a touch screen may function as both an output device of media output component 415 and input device 420.

Computing device 402 also includes a communication interface 425, which is communicatively coupleable to a remote device. Communication interface 425 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 410 are, for example, computer-readable instructions for providing a user interface to user 430 via media output component 415 and, optionally, receiving and processing input from input device 420. A user interface may include, among other possibilities, a web browser and client application. Web browsers enable users 430 to display and interact with media and other information typically embedded on a web page or a website from a web server associated with a merchant. A client application allows users 430 to interact with a server application associated with, for example, a vendor or business. For example, a client application stored on merchant terminal may enable user 430 to interact with RT computing device 110.

Figure 5:
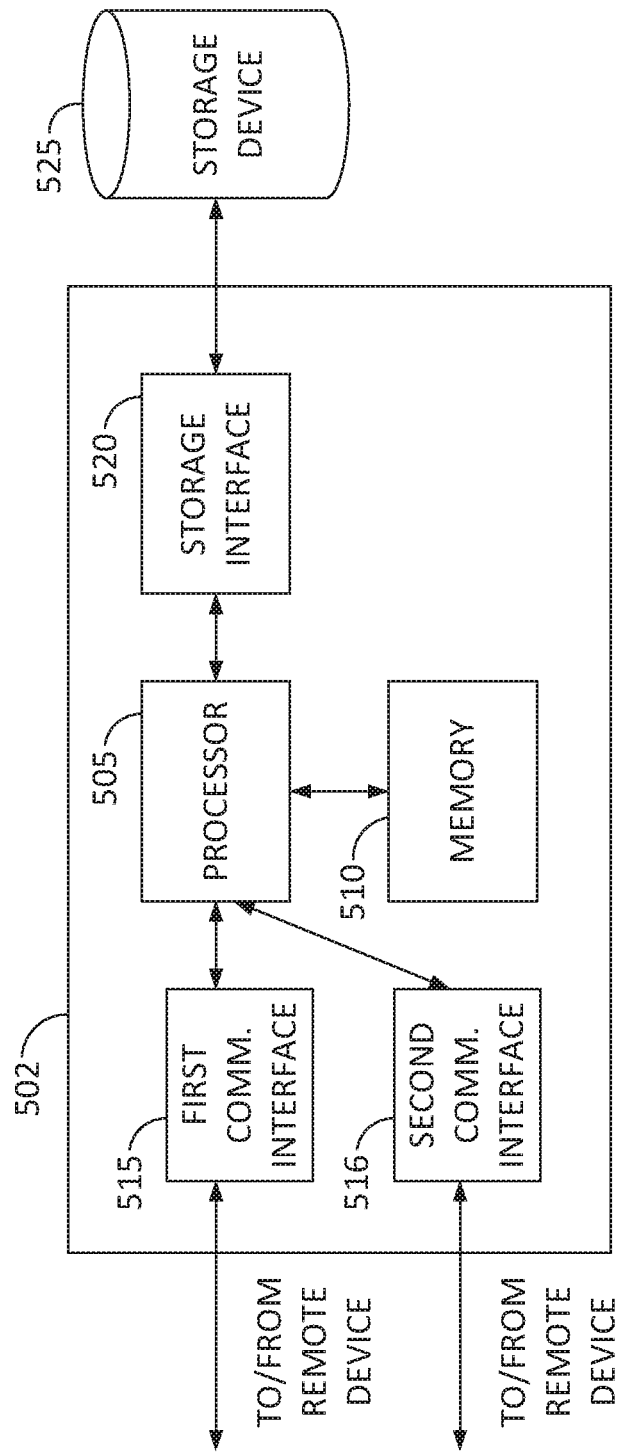
FIG. 5 is a schematic diagram of an example server computing device that may be used with the computer system shown in FIG. 1.

FIG. 5 depicts an exemplary configuration of a host computing device 502, such as RT computing device 110 (shown in FIG. 1). Host computing device 502 includes a processor 505 for executing instructions. Instructions are stored in a memory area 510, for example. Processor 505 includes one or more processing units (e.g., in a multi-core configuration).

Processor 505 is operatively coupled to a first communication (i.e., network) interface 515 and a second communication interface 516 such that host computing device 502 is capable of communicating with a remote device such as computing device 402 shown in FIG. 4 or another host computing device 502. In some embodiments, communication interface 515 and/or communication interface 516 is a virtual interface. In certain embodiments, communication interface 515 and/or communication interface 516 are associated with a network address, such as an IP address. In other embodiments, communication interface 515 and/or communication interface 516 are associated with physical network links. For example, communication interface 515 may receive network packets from a user computing device 402 via Ethernet, using a switching device.

Processor 505 is operatively coupled to a storage device 525. Storage device 525 is any computer-operated hardware suitable for storing and/or retrieving data. In some embodiments, storage device 525 is integrated in host computing device 502. For example, host computing device 502 may include one or more hard disk drives as storage device 525. In other embodiments, storage device 525 is external to host computing device 502 and is accessed by a plurality of host computing devices 502. For example, storage device 525 may include multiple storage units such as hard disks or solid state disks in a redundant array of inexpensive disks (RAID) configuration. Storage device 525 may include a storage area network (SAN) and/or a network attached storage (NAS) system.

In some embodiments, processor 505 is operatively coupled to storage device 525 via a storage interface 520. Storage interface 520 is any component capable of providing processor 505 with access to storage device 525. Storage interface 520 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 525.

Memory areas 410 (shown in FIG. 4) and 510 may include, but are not limited to, random access memory (RAM) such as dynamic RAM (DRAM) or static RANI (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

Figure 6:
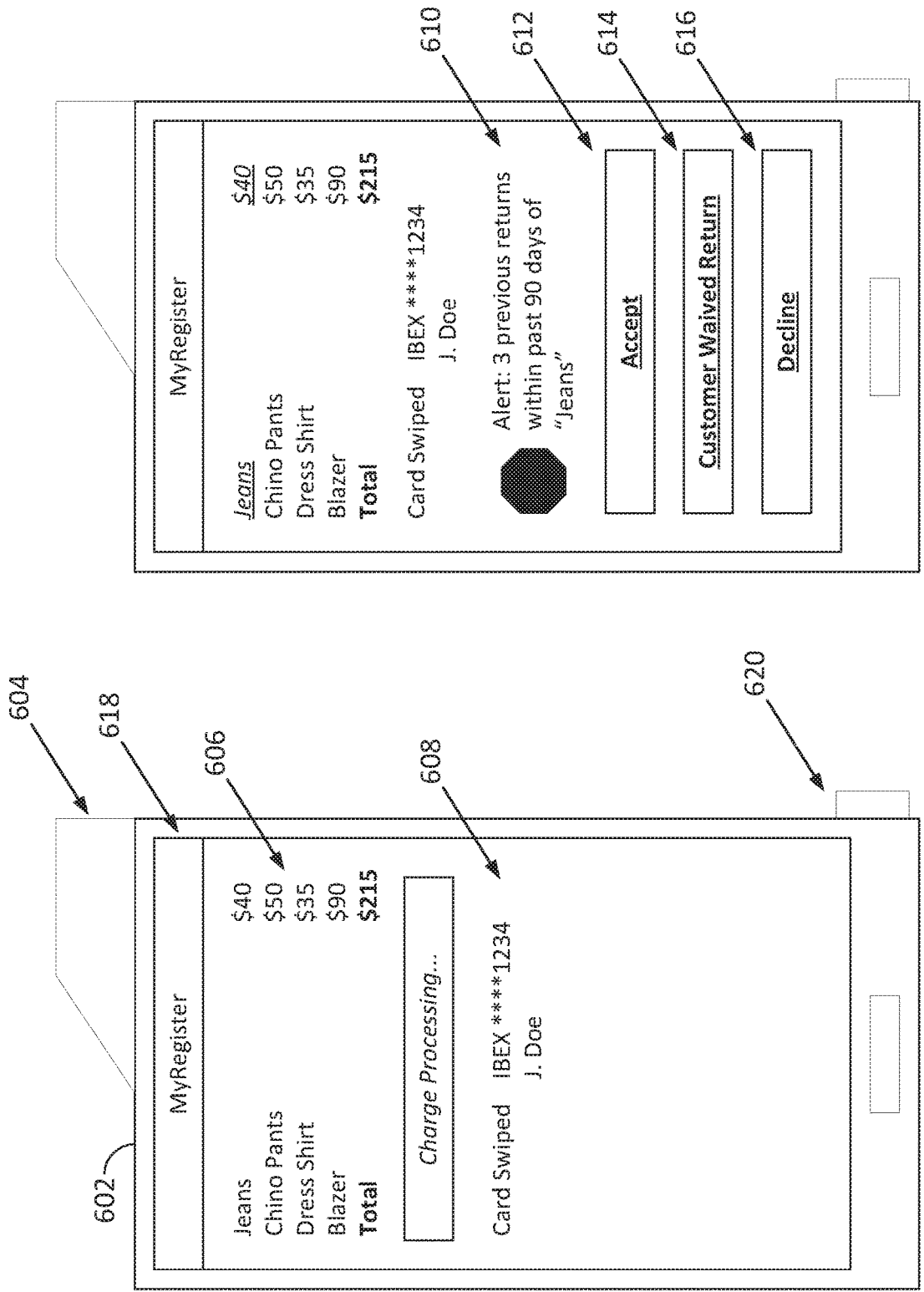
FIG. 6 is a schematic diagram illustrating an exemplary merchant terminal for the system shown in FIGS. 1-3.

FIG. 6 is an illustration of an example merchant terminal in communication with RT computing device 110. Merchant terminal 602 includes a payment card interface 604, a display 618, and a wireless network interface 620. Display 618 includes a product listing of items being purchased in a current transaction, such as product descriptions, identifiers, and categories. Display 618 also includes payment card data 608 for a card provided to pay for the current transaction, such as a payment card identifier or PAN.

In the example embodiment, merchant terminal 602 is a point-of-sale device used for retail transactions. An operator may input the items selected by a customer (e.g., product listing), and then capture payment card information from the customer using card interface 604. For example, card interface 604 may be a magnetic stripe card interface, a near field communication (NFC) interface, or a smartcard interface. More specifically, card interface 604 is configured to read data from ISO 7813, ISO 14443, and/or ISO 781 compliant payment cards. After capturing payment card information, display 618 may partially obscure payment card data 608.

In the example embodiment, merchant terminal 602 captures payment card data 608 including a PAN ending in "1234". Merchant terminal 602 transmits payment card data 608 to a payment network to process a payment card transaction for the current purchase, and in response to the payment card transaction, receives a refund fraud notification in result data 304 (shown in FIG. 3). Merchant terminal 602 displays an alert 610 based on the refund fraud notification, and alert 610 includes a category identifier (e.g., "jeans") based on product data 606 matching data in corresponding retrieved refund data structures from database 114. In other words, merchant terminal 602 receives a notification that payment card data 608 is associated with an elevated refund fraud risk, and displays a corresponding alert to the operator.

In the example embodiment, merchant terminal 602 is configured to display notification response options in addition to alert 610. Merchant terminal 602 is configured to request operator input using an accept option 612 or a decline option 616 after displaying alert 610. Merchant terminal may further cancel or complete the payment card transaction based respectively on accept option 612 and decline option 616. In some embodiments, merchant terminal 602 is configured to provide a modified policy option. In the example embodiment, merchant terminal 602 prompts for the purchaser to waive a refund policy, using customer waived refund option 614. The operator of merchant terminal 602 may ask the payment cardholder to waive a return/refund policy in response to alert 610. Merchant terminal 602 completes the payment card transaction in response to customer waived refund option 614. In certain embodiments, merchant terminal 602 stores and/or transmits an indicator that a modified refund/refund policy was selected. For example, a transaction record stored on the device is updated to include an indicator of the modified return/refund policy. As another example, addendum data associated with the payment card transaction may include the indicator of the modified return/refund policy, and is transmitted to the payment card network.

FIG. 7 is an illustration of an example cardholder device 702 in communication with RT computing device 110. Cardholder device 702 includes a display 714, and a wireless network interface 720. Display 704 is configured to display any number of product identifiers and/or product categories associated with a current purchase. Cardholder device 702 is configured to capture payment card data, including displaying payment card data fields 706 and a checkout option 708.

Cardholder device 702 is, for example, a mobile device (e.g., smartphone, tablet) or a personal computer. Network interface 720 is used to connect to a merchant terminal, such as a merchant webserver configured to capture payment information. A consumer user may use cardholder device 702 to select items from a merchant website provided by merchant terminal 128 (shown in FIG. 1)

Cardholder device 702 displays multiple form fields (e.g., payment card data 706) based on a web page retrieved from merchant terminal 128. Payment card data 706 is entered on cardholder device 702 by a user and transmitted to merchant terminal 128 to initiate a payment card transaction using a payment card network.

In the example embodiment, payment card data 706 is forwarded as a current transaction to RT computing device 110, which determines an elevated risk of refund fraud. In response, merchant terminal 128 transmits a web page including a modified policy alert 710. In alternate embodiments, merchant terminal 128 transmits an XML/JSON file to cardholder device 702, and the file causes a mobile application to display modified policy alert 710.

Modified policy alert 710 indicates a modified return and/or refund policy based on the refund risk determined by RT computing device 110, as shown in FIG. 1. For example, a refund policy is limited to a shorter time frame in response to determining that payment card data 706 is associated with an elevated risk of return/refund fraud.

Cardholder device 702 is configured to display checkout option 712, such that the cardholder accepts the modified return/refund policy. Additionally, cardholder device 702 displays an option for the user to decline the transaction and/or modified policy.

Figure 8:
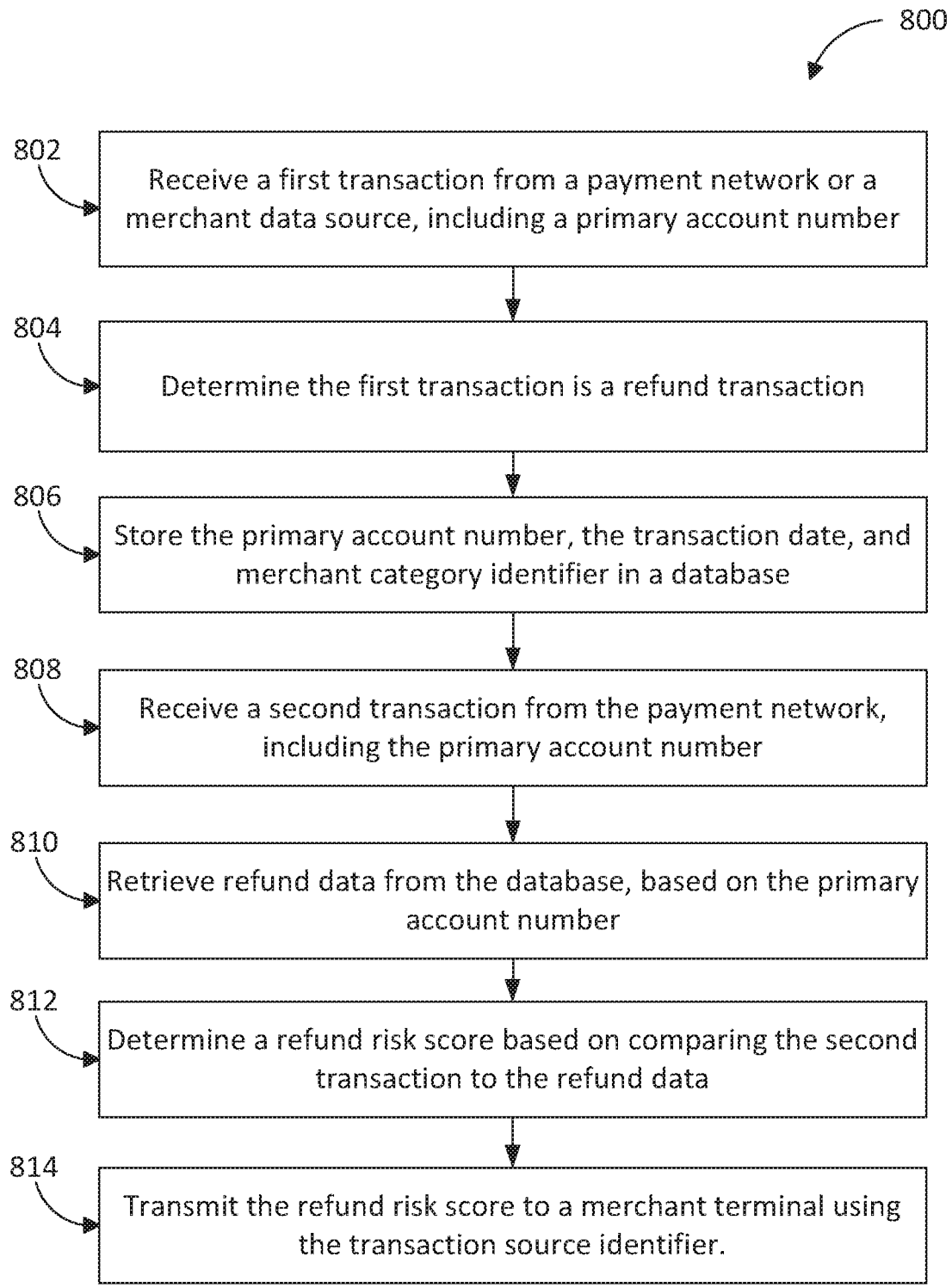
FIG. 8 is a flowchart illustrating an example process of the RT computing device of FIG. 1.

FIG. 8 is a flowchart illustrating an example process 800 performed by RT computing device 110 of FIG. 1. RT computing device 110 is configured to receive 802 historical transaction data representing a plurality of transactions from at least one of a payment network and a merchant data source, the historical transaction data received in a plurality of different formats. In one embodiment, historical transaction data is received from the payment network, such that transactions with a refund amount and/or transactions associated with a certain merchant are transmitted to RT computing device 110 by the payment network. Additionally or alternatively, historical transaction data is received from a merchant data source, such as a merchant point of sale system processing a return. The first transaction includes, for example, a cardholder identifier, a transaction date, a transaction amount, and a first merchant category identifier.

RT computing device 110 is further configured to parse 804, from the historical transaction data for each of the plurality of transactions, a plurality of fields including a cardholder identifier, a transaction date, a transaction amount, and a merchant identifier. For example, RT computing device 110 may filter out extraneous data received from a merchant data source, and may convert dates to a standard format. RT computing device 110 is further configured to store 806 the parsed data fields for each of the plurality of transactions in a harmonized refund data structure in a database, wherein the database is indexed using the primary account number associated with the cardholder identifier. More specifically, RT computing device 110 may determine a primary account number associated with the cardholder identifier by querying an external data source, such as they payment card network.

RT computing device 110 is further configured to receive 808 current transaction data for a current transaction from a merchant via the payment network, the current transaction data including a current primary account number, a current transaction source identifier, and a current merchant category identifier. For example, RT computing device 110 may receive a recently initiated payment card transaction. RT computing device 110 is further configured to retrieve 810 at least one refund data structure from the database by matching the current primary account number to the primary account number of the at least one refund data structure, and determine 812 a refund risk score based on comparing the current transaction data to the at least one refund data structure. In other words, RT computing device 110 retrieves refund data structures associated with the current transaction to determine if the current transaction has an elevated risk of return/refund fraud. RT computing device 110 transmits 814 the refund risk score to the merchant via the payment network.

Figure 9:
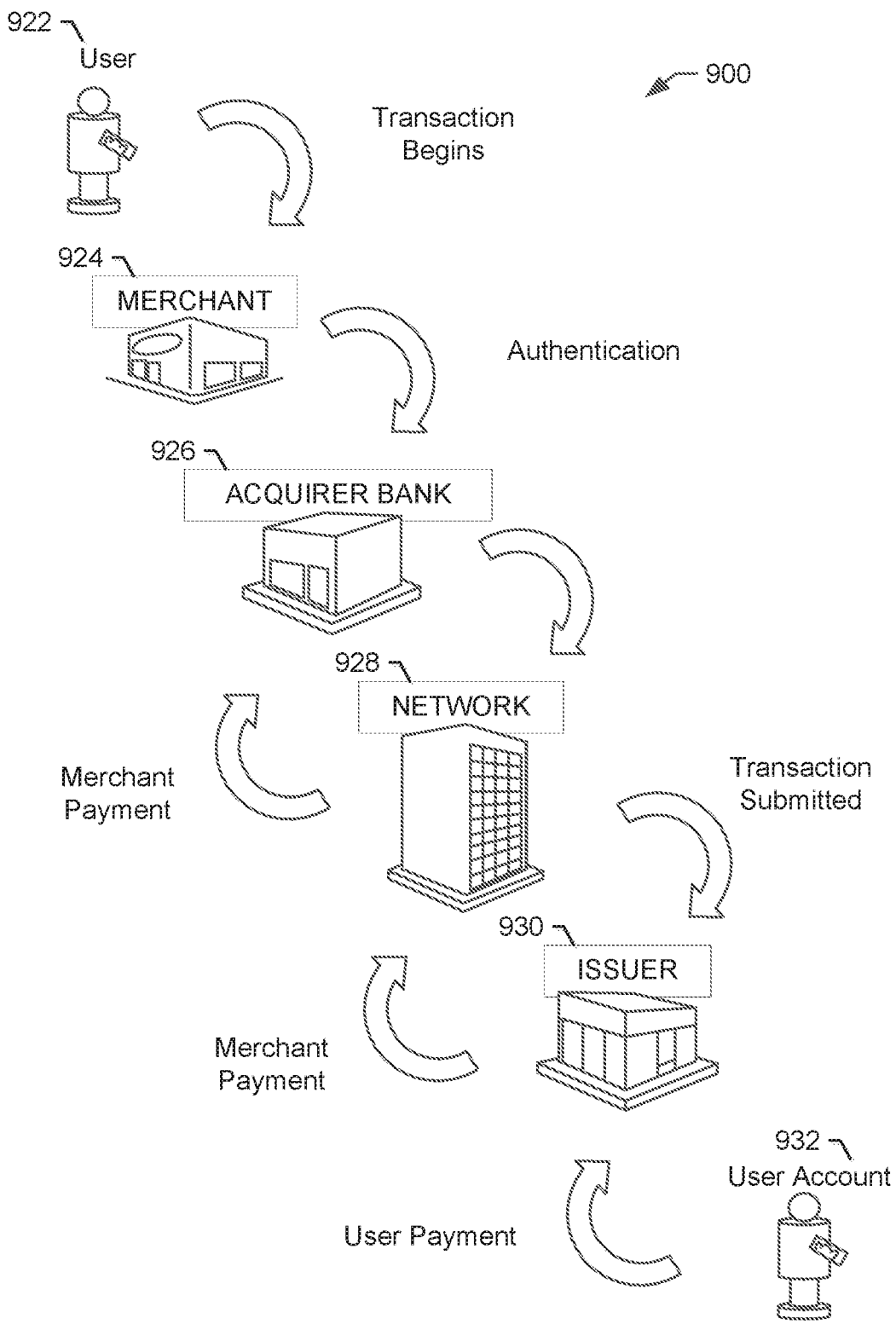
FIG. 9 is a schematic diagram illustrating an example multi-party payment processing system for enabling payment-by-card transactions.

FIG. 9 is a schematic diagram illustrating an example multi-party payment processing system 900 for aggregating, exchanging, and filtering data over a communications network. Embodiments described herein may relate to a transaction card system, such as a credit card payment system using the Mastercard® interchange network. The Mastercard® interchange network is a set of proprietary communications standards promulgated by Mastercard International Incorporated® for the exchange of financial transaction data and the settlement of funds between financial institutions that are members of Mastercard International Incorporated®. (Mastercard is a registered trademark of Mastercard International Incorporated located in Purchase, N.Y.).

As described with respect to payment processing system 900, a financial institution called the "issuer" 930 issues a transaction card or electronic payments account identifier, such as a credit card or debit card, to a user, cardholder, or user 922, who uses the transaction card to tender payment for a purchase from a merchant 924. To accept payment with the transaction card, merchant 924 must normally establish an account with a financial institution that is part of the financial payment system. This financial institution is usually called the "merchant bank," the "acquirer bank," or the "acquirer" 926. When user 922 tenders payment for a purchase with a transaction card, merchant 924 requests authorization from acquirer bank 926 for the amount of the purchase. The request may be performed over the telephone, but is usually performed through the use of a point-of-sale (POS) terminal or a computing device, which reads user's 922 account information from a magnetic stripe, a chip, or embossed characters on the transaction card and communicates electronically with the transaction processing computers of acquirer bank 926. Alternatively, acquirer bank 926 may authorize a third party to perform transaction processing on its behalf. In this case, the POS terminal will be configured to communicate with the third party. Such a third party is usually called a "merchant processor," an "acquiring processor," or a "third party processor."

Using an interchange network 928, computers of acquirer bank 926 or the merchant processor will communicate with computers of issuer bank 930 to determine whether user account 932 associated with user 922 is in good standing and whether the purchase is covered by user account 932 available credit line. Based on these determinations, the request for authorization will be declined or accepted. If the request is accepted, an authorization code is issued to merchant 924.

When a request for authorization is accepted, the available credit line of user account 932 is decreased. Normally, a charge for a payment card transaction is not posted immediately to user account 932 because bankcard associations, such as Mastercard International Incorporated®, have promulgated rules that do not allow merchant 924 to charge, or "capture," a transaction until goods are shipped or services are delivered. However, with respect to at least some debit card transactions, a charge may be posted at the time of the transaction. When merchant 924 ships or delivers the goods or services, merchant 924 captures the transaction by, for example, appropriate data entry procedures on the POS terminal. This may include bundling of approved transactions daily for standard retail purchases. If user 922 cancels a transaction before it is captured, a "void" is generated. If user 922 returns goods after the transaction have been captured, a "credit" is generated. Interchange network 928 and/or issuer bank 930 stores the transaction card information, such as a category of merchant, a merchant identifier, a location where the transaction was completed, amount of purchase, and date and time of the transaction in a database.

After a purchase has been made, a clearing process occurs to transfer additional transaction data related to the purchase among the parties to the transaction, such as acquirer bank 926, interchange network 928, and issuer bank 930. More specifically, during and/or after the clearing process, additional data, such as a time of purchase, a merchant name, a type of merchant, purchase information, cardholder account information, a type of transaction, itinerary information, information regarding the purchased item and/or service, and/or other suitable information, is associated with a transaction and transmitted between parties to the transaction as transaction data, and may be stored by any of the parties to the transaction.

For debit card transactions, when a request for a personal identification number (PIN) authorization is approved by the issuer bank 930, user account 932 is decreased. Normally, a charge is posted immediately to user account 932. The payment card association then transmits the approval to the acquiring processor for distribution of goods/services or information, or cash in the case of an automated teller machine (ATM).

After a transaction is authorized and cleared, the transaction is settled among merchant 924, acquirer bank 926, and issuer bank 930. Settlement refers to the transfer of financial data or funds among acquirer bank 926, issuer bank 930, and merchant's 924 account related to the transaction. Usually, transactions are captured and accumulated into a "batch," which is settled as a group. More specifically, a transaction is typically settled between issuer bank 930 and interchange network 928, and then between interchange network 928 and acquirer bank 926, and then between acquirer bank 926 and merchant 924.

In some embodiments, user 922 registers one or more payment cards with a digital wallet. Having done this, user 922 can interact with a participating online merchant 924. At the check-out stage, online merchant 924 displays a button on the merchant website which user 922 can click on in order to make a payment using user 922 digital wallet. Online merchant 924 then redirects user 922 to a "switch" operated by interchange network 928. Using a cookie located on cardholder device 702 (shown in FIG. 7), the "switch" is able to determine which wallet-hosting server hosts a wallet associated with user 922. The switch then establishes a connection between cardholder device 702 and the appropriate wallet-hosting system, which presents user 922 with a sign-in page (e.g., as a pop-up window), where there is an authentication process (e.g., entry of a pre-agreed password). This log-in process may use the same login credentials (e.g., password) which user 922 also uses to obtain access to other online banking activities.

In some embodiments, a unique identifier is provided to user 922. The unique identifier is different from the number associated with user account 932. In these embodiments, interchange network 928 stores the unique identifier in database 120 along with user account 932. When interchange network 928 receives the unique identifier, interchange network 928 determines the associated user account 932 and uses that information in processing the payment transaction.

The wallet-hosting system then securely transfers user 922 payment information to the online merchant's domain. The merchant's domain submits user's 922 payment information to acquirer bank 926 for a separate authorization process in which the acquiring domain communicates with the issuer bank 930 to ask the bank to authorize the transaction. Thus, user 922 is not required to enter their card details (except at the stage of initially registering with the wallet-hosting system), and the online transaction process is streamlined with only a single redirection, and consistent branding for the entire payment process, irrespective of the online merchant 924.

In the example embodiment, when user 922 completes selecting the goods and/or services that he or she desires to purchase, user 922 inputs one or more products into cardholder device 702 via keywords, a bar code, a Quick Response (QR) code, and/or other types of entry methods. Cardholder device 702 may prompt to user 922 one or more authentication criteria (a personal identification number (PIN), or biometric authentication) in order to proceed. In other embodiments, the authentication criteria are requested prior to user 922 inputting the one or more products into cardholder device 702. After the authentication criteria is met, cardholder device 702 may prompt user 922 to input or select payment credentials. Cardholder device 702 may also display to user 922 a list including products that are similar to the one or more products inputted by user 922 and one or more merchants (e.g., merchant 924) offering similar products in the list. User 922 may select one or more products and one or more merchants from the list, and payment credentials. In the example embodiment, cardholder device 702 displays the transaction amount for the purchase and user 922 confirms the transaction amount for the purchase. An application in cardholder device 702 generates transaction data including the amount of the purchase and transmits the transaction data to acquirer bank 926 based upon the information selected by user 922.

Acquirer bank 926 receives the transaction data, performs checks on the transaction data, and transmits the data to interchange network 928. Interchange network 928 performs domain control validations and de-tokenization on the transaction data. Interchange network 928 also performs PIN/shared secret verification for the authorization message included in the transaction data. Interchange network 928 transmits the authorization message to issuer bank 930. Issuer bank 930, in response to the authorization message, generates an authorization response. Issuer bank 930 transmits the authorization response to interchange network 928. Interchange network 928 transmits the authorization response to acquirer bank 926, which transmits the authorization response in the form of an approved or decline notification to one or more merchant terminals (e.g., merchant terminal 128, shown in FIG. 1) associated with merchant 924 and to cardholder device 702 associated with user 922.

As will be appreciated based on the foregoing specification, the above-described embodiments of the disclosure is implemented using computer programming or engineering techniques including computer software, firmware, hardware or any combination or subset thereof, wherein the technical effects described above are achieved. Any such resulting program, having computer-readable code means, is embodied or provided within one or more computer-readable media, thereby making a computer program product, (i.e., an article of manufacture), according to the discussed embodiments of the disclosure. The computer-readable media is, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code is made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A refund tracking (RT) computing device in network communication with (i) a payment network for processing payment transactions, and (ii) a plurality of merchant data sources associated with a plurality of different merchants that initiate payment transactions over the payment network, the RT computing device comprising:
a processor and a memory in communication with the processor, the processor programmed to:
provide a return-reporting application programming interface (API) at a hypertext transfer protocol (HTTP) address;
receive, via the return-reporting API from the plurality of merchant data sources, historical refund transaction data representing a plurality of refund transactions from the payment network and the plurality of merchant data sources, the historical refund transaction data received in a plurality of different formats from the plurality of different merchants, the plurality of different formats corresponding to a plurality of merchant-specific refund data structures;
convert the historical refund transaction data received in the plurality of different formats into harmonized refund transaction data of a shared format by parsing, from the historical refund transaction data for each of the plurality of refund transactions, a plurality of fields including a cardholder identifier, a transaction date, a transaction amount, and a merchant identifier;
store the harmonized refund transaction data including the parsed data fields for each of the plurality of refund transactions in a respective harmonized refund data structure in a central database, wherein the central database is indexed using a primary account number associated with the cardholder identifier;

receive, via the payment network, current transaction data for a current payment transaction initiated at a merchant computing device associated with a merchant of the plurality of different merchants, the current transaction data including a current primary account number, a current transaction source identifier, and a current merchant category identifier;

in response to receiving the current transaction data, retrieve a harmonized refund data structure from the central database associated with the current primary account number by matching the current primary account number to the primary account number of the retrieved harmonized refund data structure;

determine a refund risk score based on comparing the current transaction data to the historical refund transactions associated with the current primary account number in the retrieved harmonized refund data structure, wherein the refund risk score represents a likelihood that the current payment transaction will result in a future refund transaction;

determine, based upon rule data stored by the RT computing device, a score threshold for a refund alert notification;

in response to the refund risk score exceeding the score threshold and prior to authorization of the current payment transaction via the payment network, cause display, on a terminal of the merchant computing device, of the refund alert notification and a decline option; and in response to receiving a selection of the decline option, cancel the current transaction prior to authorization.

2. The RT computing device of claim 1, wherein the plurality of fields include a product identifier.

3. The RT computing device of claim 2, wherein the current transaction data includes at least one current product identifier, and wherein the processor is further programmed to determine the refund risk score based on comparing the at least one current product identifier to the product identifier of the harmonized refund data structure.

4. The RT computing device of claim 1, wherein the historical refund transaction data is generated from the payment network processing payment card transactions.

5. The RT computing device of claim 1, wherein the historical refund transaction data is generated from a merchant computing system processing at least one of return and refund transactions.

6. The RT computing device of claim 5, wherein the processor is further programmed to transmit a query to the merchant computing system configured to retrieve the historical refund transaction data.

7. The RT computing device of claim 1, wherein the current transaction data is received via a merchant point of sale computing device.

8. The RT computing device of claim 1, wherein the current transaction data is received via a merchant web server in communication with a user computing device.

9. A computer-implemented method for identifying fraud in refund transactions, said method implemented using a refund tracking (RT) computing device including a processor and a memory in communication with the processor, the RT computing device in network communication with (i) a payment network for processing payment transactions, and (ii) a plurality of merchant data sources associated with a plurality of different merchants that initiate payment transactions over the payment network, the RT computing device, said method comprising:

providing a return-reporting application programming interface (API) at a hypertext transfer protocol (HTTP) address;

receiving, via the return-reporting API from the plurality of merchant data sources, historical refund transaction data representing a plurality of refund transactions from the payment network and the plurality of merchant data sources, the historical refund transaction data received in a plurality of different formats from the plurality of different merchants, the plurality of different formats corresponding to a plurality of merchant-specific refund data structures;

converting the historical refund transaction data received in the plurality of different formats into harmonized refund transaction data of a shared format by parsing, from the historical refund transaction data for each of the plurality of refund transactions, a plurality of fields including a cardholder identifier, a transaction date, a transaction amount, and a merchant identifier;

storing the harmonized refund transaction data including the parsed data fields for each of the plurality of refund transactions in a respective harmonized refund data structure in a central database, wherein the central database is indexed using a primary account number associated with the cardholder identifier;

receiving, via the payment network, current transaction data for a current payment transaction initiated at a merchant computing device associated with a merchant of the plurality of different merchants, the current transaction data including a current primary account number, a current transaction source identifier, and a current merchant category identifier;

in response to receiving the current transaction data, retrieving a harmonized refund data structure from the central database associated with the current primary account number by matching the current primary account number to the primary account number of the retrieved harmonized refund data structure;

determining a refund risk score based on comparing the current transaction data to the historical refund transactions associated with the current primary account number in the retrieved harmonized refund data structure, wherein the refund risk score represents a likelihood that the current payment transaction will result in a future refund transaction;

determining, based upon rule data stored by the RT computing device, a score threshold for a refund alert notification;

in response to the refund risk score exceeding the score threshold and prior to authorization of the current payment transaction via the payment network, causing display, on a terminal of the merchant computing device, of the refund alert notification and a decline option; and in response to receiving a selection of the decline option, canceling the current transaction prior to authorization.

10. The method of claim 9, wherein the plurality of fields include a product identifier.

11. The method of claim 10, wherein the current transaction data includes at least one current product identifier, and wherein determining a refund risk score comprises determining the refund risk score based on comparing the at least one current product identifier to the product identifier of the harmonized refund data structure.

12. The method of claim 9, wherein the historical refund transaction data is generated from the payment network processing payment card transactions.

13. The method of claim 9, wherein the historical refund transaction data is generated from a merchant computing system processing at least one of return and refund transactions.

14. The method of claim 13, further comprising transmitting a query to the merchant computing system configured to retrieve the historical refund transaction data.

15. The method of claim 9, wherein the current transaction data is received via a merchant point of sale computing device.

16. The method of claim 9, wherein the current transaction data is received via a merchant web server in communication with a user computing device.

17. A non-transitory computer-readable storage media having computer-executable instructions embodied thereon, wherein when executed by a refund tracking (RT) computing device having at least one processor coupled to at least one memory device, the RT computing device in network communication with (i) a payment network for processing payment transactions, and (ii) a plurality of merchant data sources associated with a plurality of different merchants that initiate payment transactions over the payment network, the RT computing device, the computer-executable instructions cause the at least one processor to:

provide a return-reporting application programming interface (API) at a hypertext transfer protocol (HTTP) address;

receive, via the return-reporting API from the plurality of merchant data sources, historical refund transaction data representing a plurality of refund transactions from the payment network and the plurality of merchant data sources, the historical refund transaction data received in a plurality of different formats from the plurality of different merchants, the plurality of different formats corresponding to a plurality of merchant-specific refund data structures;

convert the historical transaction data received in the plurality of different formats into harmonized refund transaction data of a shared format by parsing, from the historical refund transaction data for each of the plurality of refund transactions, a plurality of fields including a cardholder identifier, a transaction date, a transaction amount, and a merchant identifier;

store the harmonized refund transaction data including the parsed data fields for each of the plurality of refund transactions in a respective harmonized refund data structure in a central database, wherein the central database is indexed using a primary account number associated with the cardholder identifier;

receive, via the payment network, current transaction data for a current payment transaction initiated at a merchant computing device associated with a merchant of the plurality of different merchants, the current transaction data including a current primary account number, a current transaction source identifier, and a current merchant category identifier;

in response to receiving the current transaction data, retrieve a harmonized refund data structure from the central database associated with the current primary account number by matching the current primary account number to the primary account number of the retrieved harmonized refund data structure;

determine a refund risk score based on comparing the current transaction data to historical refund transactions associated with the current primary account number in the retrieved harmonized refund data structure, wherein the refund risk score represents a likelihood that the current payment transaction will result in a future refund transaction;

determine, based upon rule data stored by the RT computing device, a score threshold for a refund alert notification;

in response to the refund risk score exceeding the score threshold and prior to authorization of the current payment transaction via the payment network, cause display, on a terminal of the merchant computing device, of the refund alert notification and a decline option; and in response to receiving a selection of the decline option, cancel the current transaction prior to authorization.

18. The computer-executable instructions of claim 17 wherein the plurality of fields include a product identifier.

19. The computer-executable instructions of claim 18, wherein the current transaction data includes at least one current product identifier, and wherein the computer-executable instructions cause the at least one processor to determine the refund risk score based on comparing the at least one current product identifier to the harmonized refund data structure.

20. The computer-executable instructions of claim 17, wherein the computer-executable instructions further cause the processor to transmit a query to a merchant computing system configured to retrieve the historical refund transaction data.

21. The computer-executable instructions of claim 17, wherein the computer-executable instructions further cause the at least one processor to receive the current transaction data via a merchant point of sale computing device.

22. The computer-executable instructions of claim 17, wherein the computer-executable instructions further cause the at least one processor to receive the current transaction data via a merchant web server in communication with a user computing device.

* * * * *